May 26, 1959 E. STUMP 2,887,995
INTERNAL COMBUSTION ENGINE WITH FUEL INJECTION
INTO THE COMBUSTION CHAMBER
Filed March 6, 1956 2 Sheets-Sheet 2
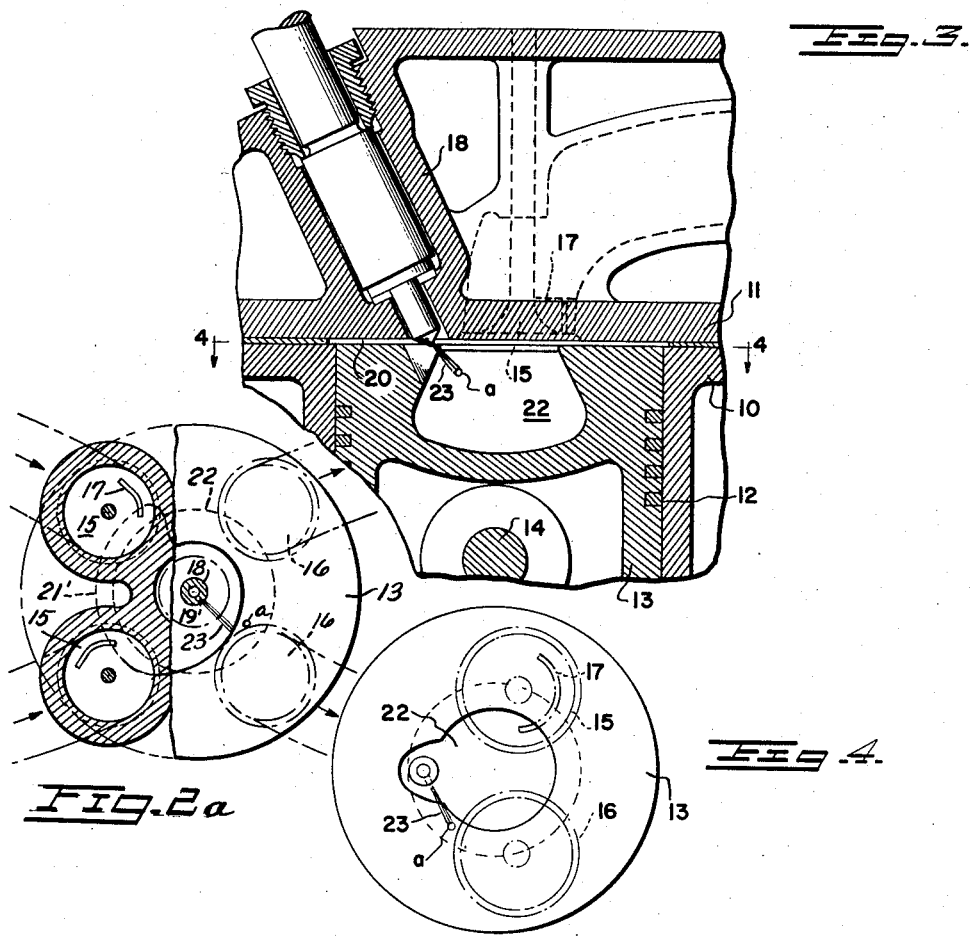
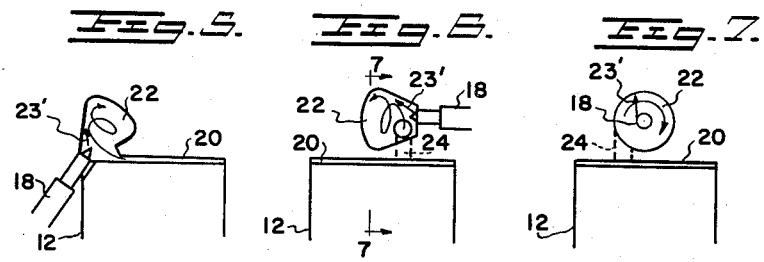
INVENTOR
EUGEN STUMP
BY *Dicke and Craig*
ATTORNEYS.

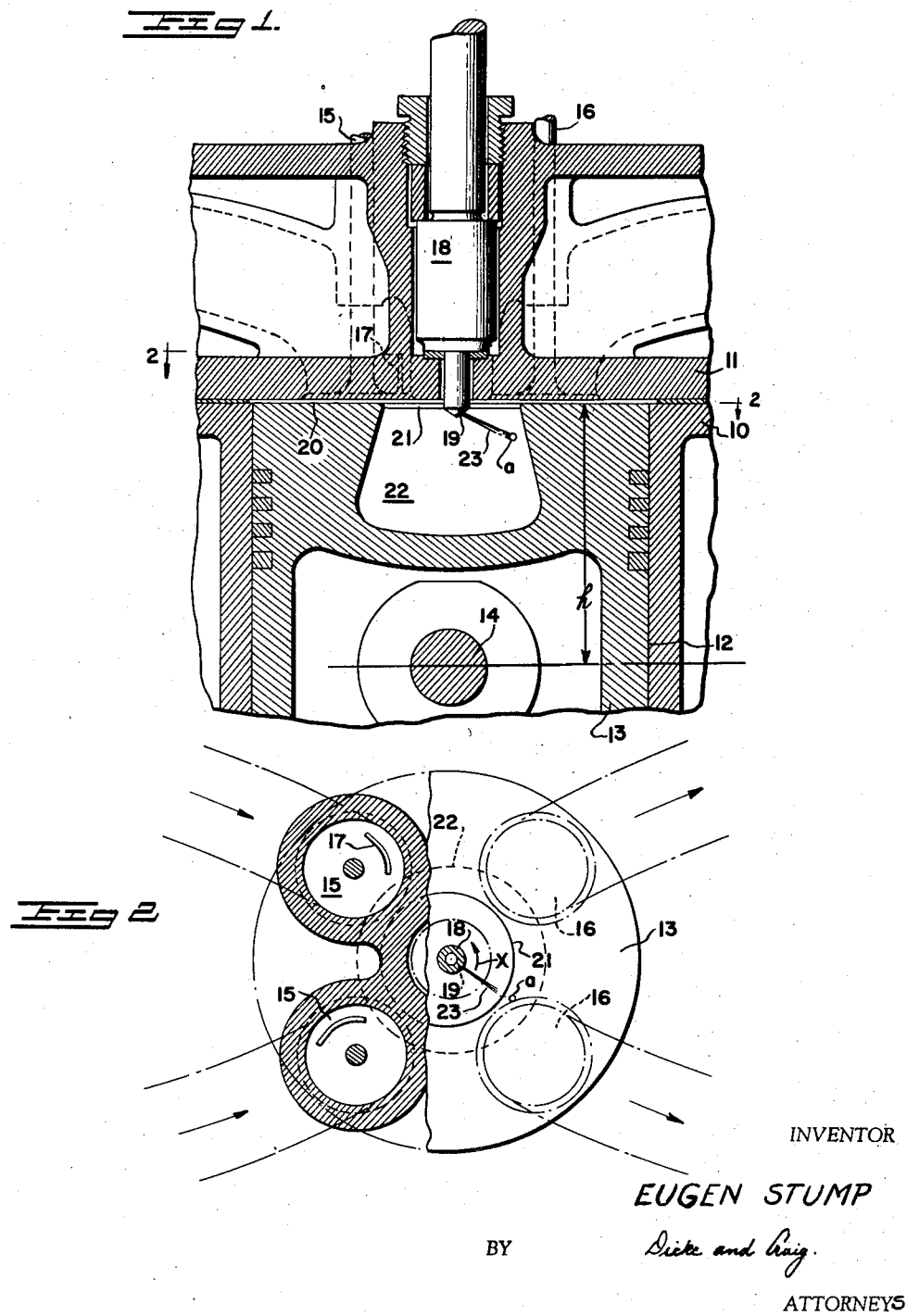

United States Patent Office 2,887,995
Patented May 26, 1959

2,887,995

INTERNAL COMBUSTION ENGINE WITH FUEL INJECTION INTO THE COMBUSTION CHAMBER

Eugen Stump, Stuttgart-Unterturkheim, Germany, assignor to Daimler-Benz Aktiengesellschaft, Stuttgart-Unterturkheim, Germany Application March 6, 1956, Serial No. 569,838

Claims priority, application Germany March 8, 1955

19 Claims. (Cl. 123—32)

This invention relates to an internal combustion engine provided with a combustion chamber which is formed essentially as a body of revolution, against the walls of which the fuel is injected at least in part, and more particularly relates to an internal combustion engine provided with a combustion chamber formed as a body of revolution which is enlarged essentially conically in the direction toward the end thereof opposite to that where the injection nozzle is located.

Accordingly, it is an object of the present invention to provide an internal combustion engine which operates smoothly and is characterized by relatively soft combustion processes.

Another object of the present invention resides in the provision of an internal combustion engine in which the fuel is injected against the combustion chamber walls and in which the thus injected fuel is distributed over a relatively large area of the combustion chamber walls.

A still further object of the present invention is to provide an internal combustion engine with a combustion chamber formed essentially as a body of revolution with one end thereof conically enlarged, the fuel being injected against a wall part in the narrow end of the combustion chamber and being thereupon evenly distributed over the remainder of the lateral or side walls of the combustion chamber by a spirally rotating air stream of the combustion air.

Another object of the present invention is to provide an internal combustion engine in which the distance between the upper surface of the piston head and the center of the wrist pin is minimized thereby resulting in a relatively low engine of relatively small weight.

Another object of the present invention is the provision of a combustion chamber formed essentially completely in the piston head against the walls of which the fuel is injected in a relatively narrow well-defined jet and in which the combustion air charge is used to distribute the fuel over the remainder of the lateral combustion chamber walls.

By the use of a conically shaped combustion chamber it is possible to achieve that the injected fuel which impinges on the side walls of the conically shaped combustion chamber covers the same evenly, especially if a whirling turbulence or eddying of the combustion air is produced in the combustion chamber by means of which the fuel is driven outwardly by centrifugal forces along the conically shaped walls thereof so that it may be distributed over essentially the entire lateral walls of the combustion chamber from a point near the injection nozzle to the most distant or remote parts of the combustion chamber walls. A construction in accordance with the present invention is in sharp contrast as regards operation and combustion process, for example, to a spherically-shaped combustion chamber in which the fuel tends to concentrate in the plane of the largest diameter and to produce thereat the heaviest, thickest layer of fuel thereby resulting in uneven and relatively sparse fuel distribution over the other walls of the spherical combustion chamber. However, the combustion becomes the smoother and better the thinner the fuel layer is distributed over the entire combustion chamber walls.

The present invention is particularly of significance for such internal combustion engines in which the combustion chamber is arranged in the piston head and in which the injection nozzle is arranged in the cylinder head. However, the underlying, basic concepts of the present invention may also be applied to engines in which other arrangements of the combustion chamber and of the nozzle are provided, for example, in which the combustion chamber is arranged in the cylinder head. The injection nozzle may be arranged concentrically as well as eccentrically to the axis of the combustion chamber.

In an arrangement in accordance with the present invention in which the combustion chamber is located essentially completely in the piston head, it is possible to attain the further advantage with respect to a spherically shaped combustion chamber of equal dimension that the distance between the wrist pin center and the upper surface or edge of the piston head may be made considerably smaller so that the engine resulting by a construction in accordance with the present invention may be made of lesser overall height and of smaller total weight.

Further features, objects and advantages of the present invention will become more obvious from the following description when taken in connection with the accompanying drawing which shows, for purposes of illustration only, several embodiments in accordance with the present invention and wherein:

Figure 1 is a cross-sectional axial view through an engine in accordance with the present invention in which the injection nozzle is arranged approximately coaxial with the axis of the cylinder.

Figure 2 is a cross-sectional view of an internal combustion engine in accordance with the present invention taken along line 2—2 of Figure 1 in which the valves located in the cylinder head are indicated in phantom, dash and dotted lines.

Figure 2a is a cross sectional view of a slightly modified embodiment of an internal combustion engine in accordance with the present invention taken along line 2—2 of Figure 1 in which the transition passage from the cylinder into the combustion chamber is shaped to facilitate the inflow of the rotation air into the combustion chamber and to enhance the whirling motion of the air.

Figure 3 is an axial cross-sectional view of another embodiment of an internal combustion engine in accordance with the present invention in which the injection nozzle is arranged eccentrically to the combustion chamber.

Figure 4 is a top plan view showing the piston head and taken along lines 4—4 of Figure 3 in which the valves are indicated by phantom, dot and dash lines.

Figure 5 is a schematic view of still another embodiment in accordance with the present invention in which the combustion chamber is arranged in the cylinder head.

Figure 6 is a schematic view similar to Figure 5 of still a further embodiment in accordance with the present invention in which the combustion chamber is also arranged in the cylinder head, and Figure 7 is a cross-sectional view taken along line 7—7 of Figure 6.

Referring now more particularly to the drawings wherein like reference numerals are used throughout the various views to designate like parts, reference numeral 10 designates a water-cooled cylinder block and reference numeral 11 the cylinder head which may also be water cooled. The piston 13 which is connected with the connecting rod by means of a wrist pin at 14, reciprocates within the cylinder 12 formed in the cylinder block 10.

The inlet valves 15 and the outlet valves 16 which may be overhead valves are suspended in any conventional manner in the cylinder head 11. The inlet valves 15 are provided with shields or baffle plates 17 which extend essentially in the direction of the valve axes along the upper surfaces of the valve disks and form partial deflection plates for the inflowing combustion air. The shields or baffle plates 17 are so arranged as to impart a rotational component to the air which enters, when the inlet valves are opened, through the valve cross section so that the combustion air within the cylinder space rotates approximately in the direction of the arrow $x$ about the cylinder axis.

The injection nozzle 18 is located essentially centrally between the four valves 15 and 16. The nozzle orifice which, for example, may be formed by a lateral nozzle bore 19 in the injection nozzle 18 extends into the cylinder space in such a manner that in the top dead center of the piston it lies approximately at the height of the remaining gap 20 between the piston head and the cylinder head or approximately at the height of the narrowest place 21 of the combustion chamber 22 provided in the piston head which combustion chamber 22 increases in a conical manner from the side of the injection nozzle 18 toward the axially opposite end thereof.

The fuel is injected through the nozzle orifice 19 transversely or obliquely in the direction of the air stream in a single, well-defined and relatively narrow jet 23 against the point $a$ of the combustion chamber so that it covers the combustion chamber walls in a layer-like manner and is distributed by the air stream which rotates in the direction of the arrow $x$ over larger surfaces of the combustion chamber walls.

As a result of the conical enlargement of the combustion chamber and as a result of the rotating air stream the fuel is driven, due to centrifugal forces, for example, approximately in a spiral path, against the wall parts of the combustion chamber with the largest diameter so that with an appropriately matched construction a very even disribution of the fuel over the entire height of the combustion chamber and therewith a softer, smoother combustion may be achieved.

The axis of the wrist pin may thereby be kept at a relatively small distance $h$ from the upper edge or surface of the piston 13.

In order to facilitate the inflow of the rotating air into the combustion chamber or in order to enhance the whirling or eddying motion of the air, the transition passage from the cylinder into the combustion chamber may be shaped accordingly as it is indicated, for example, at 21' in Figure 2a.

The embodiment according to Figures 3 and 4 distinguishes itself from that of Figures 1 and 2 mainly by the fact that only a single inlet valve 15 with a shield and a single outlet valve 16 are provided. The injection nozzle 18 in that case is arranged eccentrically and obliquely to the cylinder axis as well as to the combustion chamber 22. The fuel is again injected in a well-defined, relatively narrow jet 23 against the point $a$ in the walls of the combustion chamber 22, and more particularly at an incline to the direction of rotation of the whirling air turbulence which is produced by the shield or baffle plate 17 in the cylinder or in the combustion chamber.

With such an injection of the fuel which is made possible above all by the eccentric location of the injection nozzle 18 and in which the injected fuel impinges on the wall under a relatively small angle, the wide distribution of the injected fuel over the combustion chamber walls may be further enhanced.

In the embodiment according to Figure 5 which illustrates schematically a further modification, the injection nozzle 18 with the axes thereof inclined upwardly at an angle with the cylinder axis is located at the side wall of the cylinder 12 and the combustion chamber 22 formed in the cylinder head. The fuel may thereby be injected from below upwardly at an incline against the walls of the combustion chamber 22 as illustrated by the arrow 23' which indicates schematically the injected fuel jet.

In the embodiments according to Figures 6 and 7 the injection nozzle 18 as well as the combustion chamber 22 are arranged in the cylinder head each with a horizontal axis, whereby the combustion chamber 22 is in communication with the cylinder space 20 through a channel or passage 24 which terminates tangentially into the combustion chamber 22 on the side of the injection nozzle.

In each of the embodiments in accordance with the present invention the combustion air, which is compressed in the cylinder space and displaced by the piston during the compression stroke is introduced into the conically shaped combustion chamber in such a manner that it enters the combustion chamber with a rotary component producing whirling and eddying of the combustion air in the combustion chamber at the side thereof adjacent the injection nozzle and thereupon proceeds with essentially spiral movements about the axis of the combustion chamber in the direction toward the enlarged part of the conically shaped combustion chamber whereby it distributes the fuel, which is injected against the lateral walls of the combustion chamber and which covers the combustion wall in the form of a thin layer, over the entire combustion chamber.

While I have described my invention with reference to some preferred embodiments, it is understood that it is not limited thereto but is susceptible of many changes and modifications, and I intend to cover all such changes and modifications except as defined by the appended claims. For example, the present invention may also be applied in a similar manner to combustion chambers other than those described and shown. Furthermore, the invention is not limited to internal combustion engines with only a certain number of valves.

I claim:

1. In an internal combustion engine with a combustion chamber, a cylinder, a cylinder head, a piston reciprocating in said cylinder head, an inlet valve in said cylinder head, means in the inlet path for the combustion air to produce a rotary motion of said combustion air within said combustion chamber, and means located in one of said cylinder and cylinder head for injecting at least a part of a fuel jet against the lateral walls of said combustion chamber at a predetermined angle with respect to the rotating combustion air therein to distribute the injected fuel over the combustion chamber walls by said rotating combustion air, said combustion chamber being enlarged in an essentially conical manner in the direction opposite said injection means.

2. In an internal combustion engine with a combustion chamber formed essentially as a body of revolution, a cylinder, a cylinder head, a piston reciprocating in said cylinder head, an inlet valve in said cylinder head, means in the inlet path for the combustion air to produce a rotary motion of said combustion air within said combustion chamber, and means located in one of said cylinder and cylinder head for injecting at least a part of the fuel jet against the lateral walls of said combustion chamber at a predetermined angle with respect to the rotating combustion air therein, said combustion chamber being enlarged in a cone-like manner in the direction opposite said injection means.

3. The combination according to claim 2, wherein said first-mentioned means includes a tangential inlet passage into said combustion chamber for the combustion air to produce the rotary motion thereof.

4. The combination according to claim 2, wherein said first-mentioned means includes uni-lateral shield means on said inlet valve to produce said rotary motion of said combustion air.

5. The combination according to claim 2, wherein said fuel is injected against said lateral walls in the same direction as the direction of the rotating combustion air therein.

6. The combination according to claim 2, wherein said fuel is injected against the lateral walls in a direction essentially opposed to the direction of rotation of said combustion air.

7. The combination according to claim 2, wherein said combustion chamber is tangentially connected with the cylinder space on the side of said injection means.

8. In an internal combustion engine with a combustion chamber formed essentially as a body of revolution, a cylinder, a cylinder head, a piston reciprocating in said cylinder head, an inlet valve in said cylinder head, means in the inlet path for the combustion air to produce a rotary motion of said combustion air within said combustion chamber, and means located in one of said cylinder and cylinder head for injecting only one well-defined jet of fuel against the lateral walls of said combustion chamber at a predetermined angle with respect to the rotating combustion air therein, said combustion chamber being enlarged in a cone-like manner in the direction opposite said injection means.

9. The combination according to claim 8, wherein said fuel jet is directed essentially transversely to the direction of said rotating combustion air.

10. The combination according to claim 8, wherein said fuel jet is directed obliquely to the direction of rotation of said rotating combustion air.

11. In an internal combustion engine with a combustion chamber formed essentially as a body of revolution, a cylinder, a cylinder head, a piston reciprocating in said cylinder, at least a part of said combustion chamber being formed by an appropriately shaped recess in the piston head, inlet valve means in said engine to enable the admission of said combustion air into said combustion chamber, means in the inlet path of said combustion air to produce a rotary motion of said combustion air within said combustion chamber essentially about the axis of revolution thereof, means located in one of said cylinder and cylinder head for injecting only one well-defined jet of fuel into said combustion chamber against the side walls thereof in a predetermined direction with respect to the rotary motion of said combustion air, said combustion chamber being enlarged in an essentially conical manner in the direction opposite said injection means.

12. The combination according to claim 11, wherein said injection means is located in the cylinder head.

13. In an internal combustion engine with a combustion chamber formed essentially as a body of revolution, a cylinder, a cylinder head, a piston reciprocating in said cylinder, at least a part of said combustion chamber being formed by an appropriately shaped recess in the piston head, inlet valve means in said engine to enable the admission of said combustion air into said combustion chamber, means in the inlet path of said combustion air to produce a rotary motion of said combustion air within said combustion chamber essentially about the axis of revolution thereof, means located in one of said cylinder and cylinder head for injecting only one well-defined jet of fuel into said combustion chamber against the lateral walls thereof in a predetermined direction with respect to the direction of said rotary motion of said combustion air, said combustion chamber being enlarged in an essentially conical manner in the direction opposite said injection means, and said injection means being located in the narrowest part of said combustion chamber with said piston in the top dead center position thereof.

14. In an internal combustion engine with a combustion chamber formed essentially as a body of revolution, a cylinder, a cylinder head, a piston reciprocating in said cylinder head, said combustion chamber being formed at least in part by an appropriate recess in the piston head, an inlet valve in said cylinder head, means in the inlet path for the combustion air to produce a rotary motion of said combustion air within said combustion chamber about the axis of said combustion chamber, and means located in one of said cylinder and cylinder head for injecting a jet of fuel against the lateral walls of said combustion chamber at a predetermined angle with respect to the rotating combustion air therein to distribute the injected fuel over essentially the remainder of said lateral walls by said rotating combustion air, said combustion chamber being enlarged in a cone-like manner in the direction opposite said injection means.

15. The combination according to claim 14, wherein said engine comprises four valves located in said cylinder head and wherein said injection means is located essentially coaxially to the combustion chamber intermediate said four valves.

16. The combination according to claim 15, wherein said injection means is also located coaxially to the cylinder axis.

17. The combination according to claim 14, wherein said engine includes two valves in said cylinder head, and said injection means is located adjacent said two valves eccentrically to the axis of the combustion chamber and at an incline thereto.

18. The combination according to claim 1, wherein said injection means is located in said cylinder and said combustion chamber is located in said cylinder head.

19. The combination according to claim 1, wherein both said combustion chamber and said injection means are located in said cylinder head.

References Cited in the file of this patent

UNITED STATES PATENTS

| 2,205,493 | Saurer | June 25, 1940 |

FOREIGN PATENTS

| 394,403 | Great Britain | June 29, 1933 |
| 643,351 | Great Britain | Sept. 20, 1950 |
| 866,044 | France | Mar. 31, 1941 |
| 1,067,634 | France | Jan. 27, 1954 |